C. F. KAHLER.
DEVICE FOR OPERATING FURNACE DOORS.
APPLICATION FILED NOV. 18, 1909.

1,046,074.

Patented Dec. 3, 1912.

Fig. 1.

Fig. 2.

Witnesses:
H. J. Gettins.
N. McDonnell.

Inventor:
Charles F. Kahler
by Lynch & Doer
his Attorneys

UNITED STATES PATENT OFFICE.

CHARLES F. KAHLER, OF CLEVELAND, OHIO.

DEVICE FOR OPERATING FURNACE-DOORS.

1,046,074.  Specification of Letters Patent.  Patented Dec. 3, 1912.

Application filed November 18, 1909. Serial No. 528,666.

*To all whom it may concern:*

Be it known that I, CHARLES F. KAHLER, a citizen of the United States of America, residing at Cleveland, in the county of Cuyahoga and State of Ohio, have invented certain new and useful Improvements in Devices for Operating Furnace-Doors; and I hereby declare the following to be a full, clear, and exact description of the invention, such as will enable others skilled in the art to which it pertains to make and use the same.

This invention relates to improvements in devices for operating furnace doors.

The object of this invention is to provide simple and durable mechanism for simultaneously opening and closing furnace doors.

A further object of this invention is to provide mechanism for operating furnace doors which can be worked by the foot of the fireman thus enabling the door to be closed and opened between each shovelful of coal when filling the furnace.

My invention, therefore, consists in certain novel details of construction and combination and arrangement of parts hereinafter described in the specification, pointed out in the claims and illustrated in the accompanying drawings.

In the accompanying drawings Figure 1 is a front view of a portion of a furnace showing the doors equipped with my invention. Fig. 2 is a side view of the same.

Again referring to the accompanying drawings, 2' represents a portion of a furnace having the usual opening 4' for the admission of fuel and 3' represents the door frame which is secured to the furnace in any suitable manner around the opening 4'. Doors 11' and 14' are provided for closing the opening 4' and are arranged to swing vertically and are mounted as follows. Extending forward from the frame 3' near each each upper corner of the opening 4' are brackets 5' and 6' and adjacent to each lower corner of the opening 4' are formed similar brackets 7' and 8'. At the upper corners of the door 11' are arranged outwardly and rearwardly extending arms 9' and 10'. A shaft 15' extends through the brackets 5' and 6' so as to turn free therein and through the outer ends of the arms 9' and 10' where it is rigidly secured by screws $9^2$ and $10^2$. On the ends of said shaft 15' are rigidly secured pinions 16' and 17'. At the lower corners of the door 14' are arranged downwardly and rearwardly extending arms 12' and 13' and a shaft 18' extends through the brackets 7' and 8' so as to turn freely therein and through the outer ends of the arms 12' and 13' where it is rigidly secured by screws $12^2$ and $13^2$. On the ends of said shaft 18' are rigidly secured pinions 19' and 20'. At the sides of the door frame are arranged rack bars 21' and 22'. These bars are provided at their upper ends with teeth on their inner faces and at their lower ends with teeth on their outer faces. The bar 21' is arranged so that the upper end thereof is outside of the pinion 16' so that the teeth thereon engage with the said pinion and its lower end is behind the pinion 19' so that the teeth thereon engage with the said pinion. A guide pin 23' is mounted on the frame 3' and extends over the bar 21' near its upper end and a guide pin 25' is mounted on the frame 3' and extends under the bar 21' near its lower end. The pins 23' and 25' are preferably provided with rollers 27' and 29' respectively. The bar 22' is so arranged that the upper end thereof is outside of the pinion 17' and its lower end is behind the pinion 20' so that the teeth on the said bar engage with the respective pinions. A guide pin 24' is mounted on the frame 3' and extends over the bar 22' near its upper end and a guide pin 26' is mounted on the frame 3' and extends under the bar 22' near its lower end. The said pins 24' and 26' are preferably provided with rollers 28' and 30', respectively. A treadle 35' is operatively mounted on supports 36' and 37' and the inner ends of said treadle are operatively connected with the rack bars 21' and 22' by rods 31' and 32', respectively. A spring 38' is preferably arranged under the front end of the treadle.

It will be readily seen that when the front end of the treadle is depressed the rods 31' and 32' will be pushed up which in turn shove up the rack bars 21' and 22' which by their engagement with the pinions on the shafts 15' and 18' cause the said shafts to rotate in opposite directions swinging up the door 11' and swinging down the door 14'.

What I claim is,—

1. In a device for operating furnace doors the combination with a furnace having an opening for the admission of fuel, of a horizontally arranged shaft rotatably mounted above said opening, a horizontally arranged shaft rotatably mounted below said opening, pinions rigidly secured on said shafts, a bar slidably mounted at the side of said opening and having one end extending on the inside of the pinion on one shaft and having its other end extending on the outside of the pinion on the other shaft, teeth formed on the face of said bar adjacent to said pinions and adapted to engage therewith, means for reciprocating said bar and a pair of doors adapted to close said opening, the upper of said doors being provided with upwardly extending arms rigidly connected to the upper shaft and the lower door being provided with downwardly extending arms rigidly connected with said lower shaft.

2. In a device for operating furnace doors, the combination with a furnace having an opening for the admission of fuel, of a horizontally arranged shaft rotatably mounted above said opening, a horizontally arranged shaft rotatably mounted below said opening, pinions rigidly secured on said shafts, a bar slidably mounted at the side of said opening and having one end extending on the inside of the pinion on one shaft and having its other end extending on the outside of the pinion on the other shaft, said bar being provided with teeth on opposite faces at opposite ends of said bar adapted to engage with the said pinions, pins arranged to support said bar, one of said pins being arranged on the outside of the bar at the end of the bar which passes on the outside of the pinion and the other pin being arranged on the inside of the bar at the end of the bar which passes on the inside of the pinion, means for reciprocating said bar and a pair of doors adapted to close said opening, the upper of said doors being provided with upwardly extending arms rigidly connected to the upper shaft and the lower door being provided with downwardly extending arms rigidly connected with the lower shaft.

In testimony whereof, I sign the foregoing specification, in the presence of two witnesses.

CHARLES F. KAHLER.

Witnesses:
VICTOR C. LYNCH,
N. L. MCDONNELL.

Copies of this patent may be obtained for five cents each, by addressing the "Commissioner of Patents, Washington, D. C."